Oct. 10, 1961 D. J. BUNGER 3,003,313
TURBINE WITH AXIALLY MOVING PLANE OF ROTATION
Filed Sept. 2, 1958
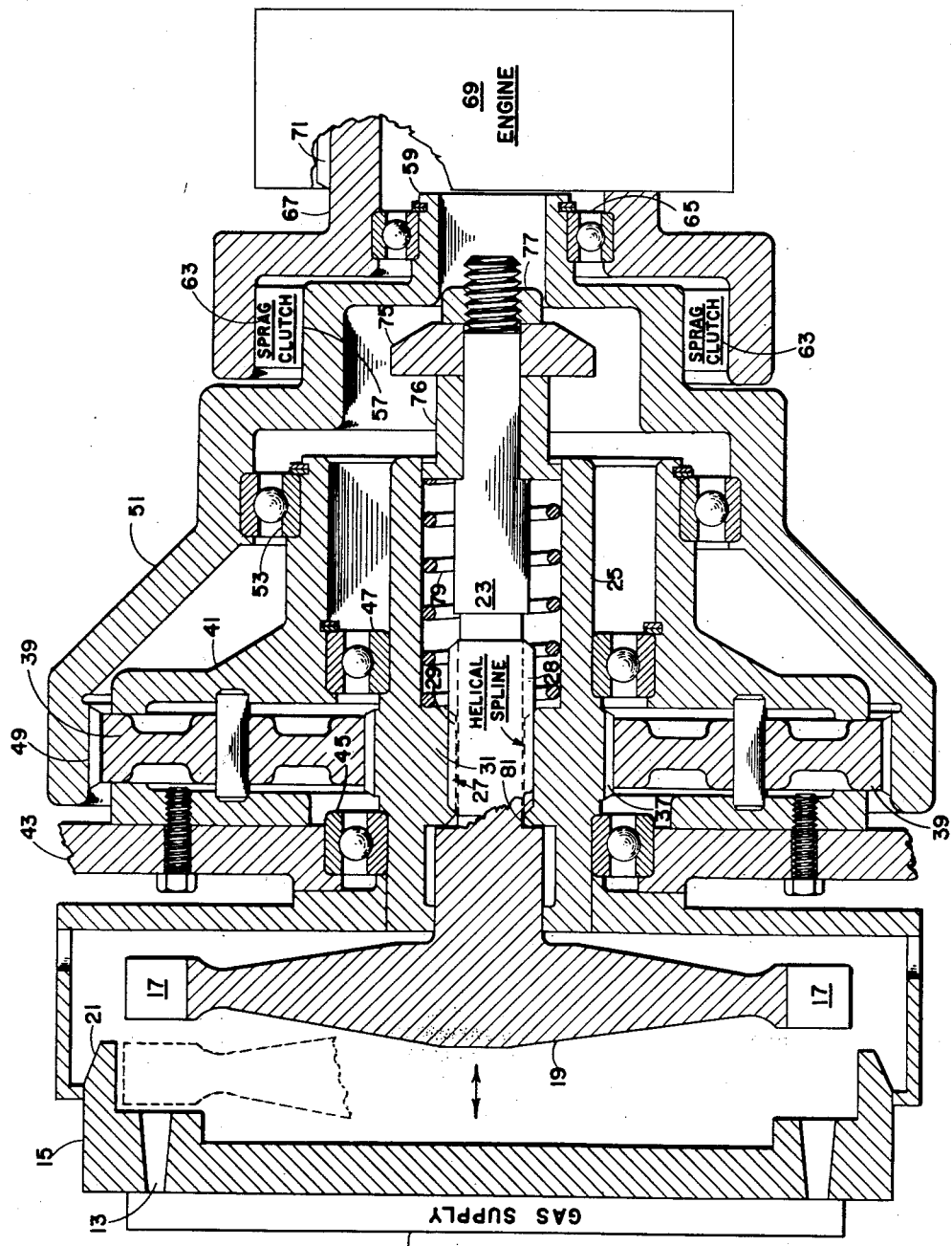
INVENTOR.
DENNEN J. BUNGER
BY
Robert W. Ely
ATTORNEY

United States Patent Office 3,003,313
Patented Oct. 10, 1961

3,003,313
TURBINE WITH AXIALLY MOVING PLANE OF ROTATION
Dennen J. Bunger, Whitesboro, N.Y., assignor to The Bendix Corporation, a corporation of Delaware
Filed Sept. 2, 1958, Ser. No. 758,361
3 Claims. (Cl. 60—39.14)

This invention relates to driving mechanisms which are powered by turbines and more particularly concerns aircraft starter arrangement having such turbine-powered mechanisms.

In typical aircraft starters for jet engines, the high speed turbine rotates only in a fixed plane of rotation so that the turbine is always subject to the full force of the gases for driving the turbine. Large, heavy disc-pack clutches are typically provided because it is necessary to absorb the shock loads which develop in the driving mechanism since the driving gases rapidly power the turbine. In addition to requiring considerable space in, and adding significant weight to, such a starter, some clutches require frequent maintenance. Further, in such turbine-powered drive units, it is necessary to provide a speed limiting governor device which acts very rapidly to cut off the turbine gas supply and hence to limit the speed of a rapidly accelerating turbine if the turbine is disconnected from its load at startup or when the turbine is disconnected from its load (the connected jet engine).

An object of the present invention is to provide an improved turbine-powered driving mechanism which does not require a shock-absorbing clutch. A further object is the provision of a turbine-powered driving mechanism having improved means which limit its speed at start-up if not loaded and during operation when not loaded. Another object is the provision of an improved aircraft starter having an axially-movable turbine so arranged that the driving force is gradually developed and the turbine cannot accelerate to destruction when not loaded. An additional object is to provide such an aircraft starter which is compact and reliable in operation.

The realization of the above objects along with the features and advantages of the present invention will be apparent from the following detailed description and the accompanying drawing.

The drawing is a side cross-sectional view with parts shown schematically and shows an aircraft turbine starter having a turbine wheel axially-spaced from nozzles in speed-limiting, low torque position and so arranged that the turbine wheel will move axially to normal position to gradually develop torque when loaded and will remain in, or return to, the speed-limiting position when not loaded.

Referring to the drawing, means for providing turbine driving gases is shown schematically by a box symbol 11 and can be a combustion chamber as disclosed in U. S. Patent No. 2,811,832 or a regulated source of pressurized air. A ring of equi-spaced nozzles 13 in nozzle plate 15 direct gases at an angle toward the peripheral blades 17 of the axial flow turbine wheel 19. It is to be noted that the turbine wheel 19 is axially spaced from the outlets of the nozzles 13. Annular shroud 21 extending axially from the periphery of the nozzle plate 15 will block lateral movement of gases from the periphery of the turbine blades 17 when the turbine 19 is positioned adjacent the nozzles for full efficiency. The turbine shaft 23 extends axially and is partially encased by barrel member 25 which is helically-splined by connection 27 to the spline 28 in the intermediate part of the shaft 23. The helical spline 29 of barrel 25 is in a radially-inwardly-projecting annular shoulder 31 which extends from the intermediate interior surface of the barrel member 25. The spline connection 27 has a forty degree lead angle. Barrel member 25 has a pinion gear 37 formed at its intermediate exterior which mates with four planet gears 39 (two of which appear) of the speed-reducing gear train.

Planet gears 39 are rotatably mounted in a cage 41 which is connected to housing 43. Housing 43 confines bearing 45 which rotatably supports barrel member 25 at its axially-inner turbine end. Cage 41 supports bearing 47 which rotatably mounts the barrel member 25 at the other side of pinion or sun gear 37. Pinion 37 through planet gears 39 drives ring gear 49 which is formed in the turbine end of a tubular drive member 51 which surrounds the cage 41 and is supported thereon by bearing 53.

Drive member 51 has first and second radially-inwardly-stepped ledges 57 and 59 at the axially-outer end thereof. Engine-connecting member 67 is connected to drive member 51 at ledge 57 by one-way coupling means or overrunning clutch 63 of the conventional sprag-type so that the starter can drive the engine, but not vice versa. The axially-outer ledge 59 carries bearing 65 which rotatably supports the tubular engine-connecting member 67. An engine 69 such as a jet aircraft engine (shown schematically) is connected to splines 71 of engine-connecting member 67. It is to be noted that, when the turbine wheel 19 is first rotated by gases, the engine 69 and the starter gear train will impose a load on the turbine wheel so that it will move via the helical spline 27 from its axially-spaced position toward the nozzles 13.

Turbine shaft 23 has at its axially outer or right end a stop collar 75 and a guide collar 76 which are positioned on the shaft by nut 77 threaded on the end of the shaft. Collar 76 extends from stop 75 to within barrel 25. Stop collar 75 has such a diameter that it will abut the right or axially-outer end of barrel member 25 and provide means for positioning the turbine wheel 19 in normal or full torque relation to the turbine nozzles 13, as indicated by the dashed-lines, in cooperation with the helix 27 which will cause the loaded turbine wheel to advance when rotated by gases. Guide collar 76 is slidably mounted in barrel 25 and confines one end of spring 79. Spring 79 surrounds the turbine shaft and provides with shoulder 81 at axially-inner part of the shaft, means for axially-spacing the turbine wheel when not powered. Spring 79 at its other end abuts the axially-outer end of shoulder 31 of barrel member 25 and thus is arranged to urge the wheel away from the nozzles. The axially-spacing of the turbine wheel is limited by stop shoulder 81 which abuts the turbine-end of the barrel helical spline 29. Conventional seals and lubrication means (not shown) are provided to protect the interior of the barrel member. Spring 79 is, of course, selected so that it does not permit the turbine to move to full-torque position until an axial force is generated at the helix 27 which results from full normal load.

In operation, the turbine wheel 19 which is positioned as shown by spring 79 and stop shoulder 81 will begin to rotate slowly because gases directed by nozzles 13 and shroud 21 partially impinge against the spaced turbine blades 17 due to the turbine's retarded position from nozzles 13. As so positioned or axially-spaced, the gases do not act efficiently against the turbine 19 and produce only a small portion of the torque which the turbine is normally capable of developing. Rotation of shaft 23 causes rotation of drive pinion 37 and the planetary gear train or system. If this driving mechanism is intact and is connected by an operative sprag clutch 63 and intact engine connecting member 67 to the engine or other load, there will be resistance to rotation of the planetary gearing. This resistance produces forces which causes the turbine wheel to advance in the helical spline 27 against the spring 79 which exerts a predetermined axial force.

As the turbine 19 advances closer to the nozzles 13, the forces causing the advance will gradually increase, reaching a maximum when the turbine is fully advanced to normal operating position when stop collar 75 abuts barrel member 25. The gradual development of the forces on the turbine wheel as it advances results in the soft application of load on the drive mechanism of the starter. This operation permits the elimination of the bulky and heavy disc type clutch. As long as the driving mechanism is driving, the turbine will be held in advanced position due to the system of forces. The force system will collapse when the driven load begins to override the driving mechanism via sprag clutch 63. Upon such collapse the turbine 19 will be rapidly moved to retarded or spaced position by spring 79 when stop shoulder 81 again abuts the inner end of the barrel spline 29. Likewise when the gas supply through nozzles 13 ceases.

In the retarded position, the turbine will not accelerate beyond a safe rotational speed. Thus, if the driving mechanism has a break therein before start-up or if there is a disconnection during the driving cycle so that the load is not connected, the turbine will be in, or will move to, retarded position so that it does not rapidly accelerate to destruction.

From the foregoing it is apparent that the turbine will not advance unless loaded and will not accelerate to overspeed when in unloaded condition. In the event the load is lost, the turbine immediately retracts to a self-limiting speed condition. The gradual developing of forces makes the need of a disc-type clutch unnecessary and permits reduction in size and weight.

It is to be understood that persons skilled in the art can make changes in the disclosed embodiment without departing from the invention as set forth in the appended claims.

What is claimed is:

1. A turbine-powered drive unit comprised of a turbine wheel having a shaft, gas means arranged to direct gases to said turbine wheel to cause rotation thereof, a speed-reducing gear train, connection means including an axially-fixed rotatably-mounted barrel member surrounding said shaft operably connecting said turbine shaft to said gear train, said barrel member having an external pinion gear connected to said gear train, spring means cooperating with said barrel member and spacing said turbine wheel in partially-effective speed-limiting position in relation to said gas means and providing a predetermined axial force, said shaft being helically splined in said barrel member so that said shaft and turbine wheel move axially toward said gas means against said axial force when said turbine wheel is rotated and said gear train is connected to a predetermined load, stop means constructed and arranged to limit the axial movement of said turbine wheel toward said gas means so that said turbine wheel is positioned in fully-effective relation to said gas means, said spring means being arranged to return said turbine wheel to said partially-effective speed-limiting position when said gear train is not so loaded; whereby the turbine gradually develops torque and the turbine wheel rotates at safe speeds when not loaded.

2. A turbine-powered drive unit comprised of a turbine wheel having a shaft, gas means arranged to direct gases to said turbine wheel to cause rotation thereof, a speed-reducing gear train, connection means including rotatably-mounted barrel member surrounding said shaft operably connecting said turbine shaft to said gear train, said barrel member having a pinion gear connected to said gear train, spring means spacing said turbine wheel in partially-effective speed-limiting position in relation to said gas means and providing a predetermined axial force, said shaft being helically splined in said barrel member so that said shaft and turbine wheel move axially toward said gas means against said axial force when said turbine wheel is rotated and said gear train is connected to a predetermined load, stop means constructed and arranged to limit the axial movement of said turbine wheel toward said gas means so that said turbine wheel is positioned in fully-effective relation to said gas means, said spring means being arranged to return said turbine wheel to said partially-effective speed-limiting position when said gear train is not so loaded, whereby the turbine gradually develops torque and the turbine wheel rotates at safe speeds when not loaded, said spring means including a coil spring surrounding said shaft within said barrel member, a guide collar mounted on said shaft and slidably received in said barrel member, said guide collar and said barrel member confining said spring so that said turbine wheel is urged away from said gas means.

3. An aircraft starter comprised of an axial-flow turbine wheel having a shaft, a ring of gas nozzles and a shroud arranged to direct gases to said turbine wheel, means including a rotatably-mounted barrel member which partially surrounds said shaft and a coil spring within the barrel member arranged so that said turbine wheel is spaced away from said nozzles a distance such that the energy of gases from said nozzles is only partially effective on said turbine wheel, the spacing being such that said turbine wheel is in a safe-speed low-torque position, said barrel member and said shaft each having a helical spline which form a helical spline connection, said barrel member having a pinion gear thereon, a speed-reducing gear train having planet gears connected to said pinion gear, an engine-connecting member adapted to be connected to a jet engine, coupling means connecting said engine-connecting member to said gear train constructed so that the starter is not driven by a connected engine, said turbine wheel being arranged to advance axially in the helical spline connection toward said nozzles to a full-torque position when a predetermined load is imposed through said gear train on said barrel member, said turbine shaft having a stop shoulder between said turbine wheel and said turbine shaft spline, stop means on said barrel member abutting said stop shoulder to limit the spacing of said turbine wheel to said safe-speed low-torque position, said turbine shaft having a stop collar between said shaft spline and the end of said shaft, said stop collar being constructed to abut against the axially-outer end of said barrel member to limit said turbine wheel in full-torque position, a guide collar mounted on said shaft and extending from said stop collar toward the axially-outer end of said barrel member, said collar being slidably received in said barrel member, said coil spring within said barrel member extending from the spline of said barrel member around said shaft to said guide collar.

References Cited in the file of this patent

UNITED STATES PATENTS

| 2,245,017 | Sinclair | June 10, 1941 |
|---|---|---|
| 2,558,840 | Gordon | July 3, 1951 |
| 2,614,798 | Rubbra | Oct. 21, 1952 |